(12) United States Patent
Christie

(10) Patent No.: US 10,455,282 B2
(45) Date of Patent: Oct. 22, 2019

(54) SENSED CONTENT DELIVERY

(71) Applicant: PIKSEL, INC., Wilmington, DE (US)

(72) Inventor: Mark Christie, London (GB)

(73) Assignee: PIKSEL, INC, Wilmington, DE (US)

( * ) Notice: Subject to any disclaimer, the term of this patent is extended or adjusted under 35 U.S.C. 154(b) by 0 days.

(21) Appl. No.: 15/119,104

(22) PCT Filed: Feb. 13, 2015

(86) PCT No.: PCT/EP2015/053138
§ 371 (c)(1),
(2) Date: Aug. 15, 2016

(87) PCT Pub. No.: WO2015/121436
PCT Pub. Date: Aug. 20, 2015

(65) Prior Publication Data
US 2017/0055033 A1   Feb. 23, 2017

(30) Foreign Application Priority Data

Feb. 13, 2014  (GB) .................................. 1402533.2

(51) Int. Cl.
*H04N 21/442* (2011.01)
*G06F 16/955* (2019.01)
(Continued)

(52) U.S. Cl.
CPC ..... *H04N 21/44218* (2013.01); *G06F 16/436* (2019.01); *G06F 16/955* (2019.01);
(Continued)

(58) Field of Classification Search
CPC ....... H04N 21/44218; H04N 21/47202; H04N 21/47217; H04N 21/435; H04N 21/4415;
(Continued)

(56) References Cited

U.S. PATENT DOCUMENTS 5,848,934 A * 12/1998 Shiels .................... A63F 13/10
                                                         463/9
2012/0124456 A1    5/2012 Perez et al.
(Continued)

FOREIGN PATENT DOCUMENTS

WO   WO 2013/006644 A1   1/2013
WO   WO 2013/154561 A1  10/2013

OTHER PUBLICATIONS

International Search Report and Written Opinion, dated Apr. 21, 2015, EPO.

*Primary Examiner* — Nasser M Goodarzi
*Assistant Examiner* — Patrick A Ryan
(74) *Attorney, Agent, or Firm* — Holzer Patel Drennan

(57) ABSTRACT

In some embodiments a content delivery system for controlling media content provided by at least one media device for media consumption by at least one consumer is described. In an embodiment the system comprises at least one sensor for sensing body data of the at least one consumer, a receiver for receiving sensed body data from the sensor, a data store storing media content for selection, at least one media device for outputting said selected content to said at least one consumer, and at least one processor configured to query said data store and control the selection of said media content based at least in part on the sensed body data, and control the output of said selected media content to said at least one media device. The sensed body data may indicate the mood or emotional state of the consumer.

18 Claims, 4 Drawing Sheets

(51) Int. Cl.
H04N 21/435 (2011.01)
H04N 21/4402 (2011.01)
H04N 21/4415 (2011.01)
H04N 21/472 (2011.01)
H04N 21/858 (2011.01)
G06F 16/435 (2019.01)
G06Q 30/02 (2012.01)

(52) U.S. Cl.
CPC ....... *G06Q 30/0269* (2013.01); *H04N 21/435* (2013.01); *H04N 21/4402* (2013.01); *H04N 21/4415* (2013.01); *H04N 21/47202* (2013.01); *H04N 21/47217* (2013.01); *H04N 21/858* (2013.01)

(58) Field of Classification Search
CPC .............. H04N 21/858; H04N 21/4402; G06F 17/30876
See application file for complete search history.

(56) References Cited

U.S. PATENT DOCUMENTS

| | | | |
|---|---|---|---|
| 2013/0205314 A1* | 8/2013 | Ramaswamy | H04N 21/44213 725/14 |
| 2015/0181291 A1* | 6/2015 | Wheatley | H04N 21/4542 725/10 |
| 2016/0015307 A1* | 1/2016 | Kothuri | A61B 5/167 702/19 |
| 2016/0182955 A1* | 6/2016 | Klappert | H04N 21/4668 725/14 |
| 2017/0055033 A1* | 2/2017 | Christie | G06F 17/30032 |

* cited by examiner

SENSED CONTENT DELIVERY

TECHNICAL FIELD

The present invention relates to content delivery. In particular, the present invention relates to methods and systems for content delivery based on audience sensing.

BACKGROUND

There is an ever increasing amount of media content, provided by for example digital or analogue television channels to consumers or viewers, either broadcast or via a network such as the internet. There is also an ever increasing consumer preference for "on-demand" content which can be selected and viewed by a consumer on an or their appropriate media device, such as a television or flat screen, tablet or laptop or mobile phone, at a time appropriate for the consumer, or if there are many consumers constituting an audience, at a time appropriate for the audience.

Navigating through the ever increasing amount of media content, whether on-demand or not, can still however be time consuming. Furthermore, traditional media content may not fit the ever-changing needs and desires of the consumer or audience, even if such media content was initially selected by the consumer or audience. Such challenges are increased when one considers the changing and perhaps differing desires of more than one consumer during the consumption of media content at the same time.

SUMMARY

According to one aspect there is provided a computer implemented method for controlling media content provided by at least one media device for media consumption by at least one consumer, the method comprising at least one processor configured to receive, from at least one sensor, sensed body data of the at least one consumer; query a data store to select media content based at least in part on the sensed body data; and control the outputting of the selected media content.

The sensed body data may be biometric data indicating the mood or emotional state of the at least one consumer.

In some embodiments, the biometric data may comprise data indicative of the mood or emotional state of the consumer. For example, the biometric data may comprise one of facial measurement characteristics, body measurement characteristics, heartbeat, pulse, temperature, skin resistance, blood sugar levels, blood pressure, oxygen saturation levels, blink rate, voice signals, voice level and tone, iris pattern data.

For example, indicators of mood may comprise body sense data measurements indicating smiling, frowning, or crying. Crossed legs or arms may indicate a negative (not open) feeling or mood, and raised voice, or heartbeat and skin resistance, blood sugar levels, and/or blood pressure, pulse, voice tone, may indicate excitement.

In another embodiment, the sensed body data may be aggregated over time.

In another embodiment, the sensed body data may be received from more than one sensor.

In yet another embodiment, the sensed body data may be received from more than one sensor at one time, and/or aggregated over time.

In another embodiment, the sensed body data may be received from more than one consumer, and optionally aggregated over consumers.

In another embodiment, the media content may be arranged in multiple fragments in the data store.

In an embodiment, the multiple fragments may be linked multidimensionally based at least in part on sensed body data, and may further be optionally linked by scene decision metadata.

In an embodiment, the selection of media content may further comprise computing a vector based on the sensed body data and scene decision metadata, the output comprising a plurality of fragments for output.

A fragment may be "skipped" by stopping the output and starting a new fragment.

In another embodiment, the controlling may comprise changing scenes of said media content for output and may be optionally based at least in part on a pre-set or consumer set body sensed threshold.

In another embodiment, the control of the output of the media content may comprise stopping the output, and said control of stopping may be optionally dependent on a pre-set, or consumer set body sensed threshold.

According to a second aspect, there is provided a content delivery system for controlling media content provided by at least one media device for media consumption by at least one consumer, the system comprising at least one sensor for sensing body data of the at least one consumer; a receiver for receiving sensed body data from the sensor; a data store storing media content for selection; at least one media device for outputting said selected content to said at least one consumer, and at least one processor configured to query said data store and control the selection of said media content based at least in part on the sensed body data, and control the output of said selected media content to said at least one media device.

In an embodiment of this aspect, the at least one sensor for sensing body data of the at least one consumer may be adapted to sense biometric data.

In other embodiments, the at least one sensor adapted to sense biometric data may comprise means for sensing at least one of facial measurement characteristics, body measurement characteristics, heartbeat, pulse, temperature, skin resistance, blood sugar levels, blood pressure, oxygen saturation levels, blink rate, voice signals, voice level and tone, iris pattern data.

In another embodiment, the processor may be configured to aggregate the sensed biometric data over time.

In another embodiment, the system may comprise more than one sensor and the sensed body data may be received from said more than one sensor.

In an embodiment, the sensed body data may be received from more than one consumer.

In yet another embodiment, the data store may store media content in multiple fragments, and optionally the multiple fragments may be linked multidimensionally based at least in part on sensed body data and/or by scene decision metadata.

In another embodiment, the processor may be configured to select media content for output by computing a vector based on the sensed body data and scene decision metadata.

In yet another embodiment of this aspect there is provided a scene insertion engine for controlling the insertion and synchronising of said output to said at least one media device.

In a third aspect, there is provided a content delivery computing device for controlling media content provided by at least one media device for media consumption by at least one consumer, the device comprising at least one sensor for sensing body data of the at least one consumer; a receiver for receiving sensed body data from the sensor; a data store storing media content for selection; at least one media device for outputting said selected content to said at least one consumer; and at least one processor configured to query said data store and control the selection of said media content based at least in part on the sensed body data, and control the output of said selected media content to said at least one media device.

In a fourth aspect, there is provided a computer program product for controlling media content provided by at least one media device for media consumption by at least one consumer, the computer program product being embodied on a computer readable medium and configured so as to cause a processor, when executed, to receive from at least one sensor sensed body data of the at least one consumer; query a data store to select media content based at least in part on the sensed body data; and control the outputting of the selected media content.

BRIEF DESCRIPTION OF THE DRAWINGS

For a better understanding of the present disclosure and to show how the same may be put into effect, reference will now be made, by way of example only, to the following drawings in which.

DETAILED DESCRIPTION

Figure 1:
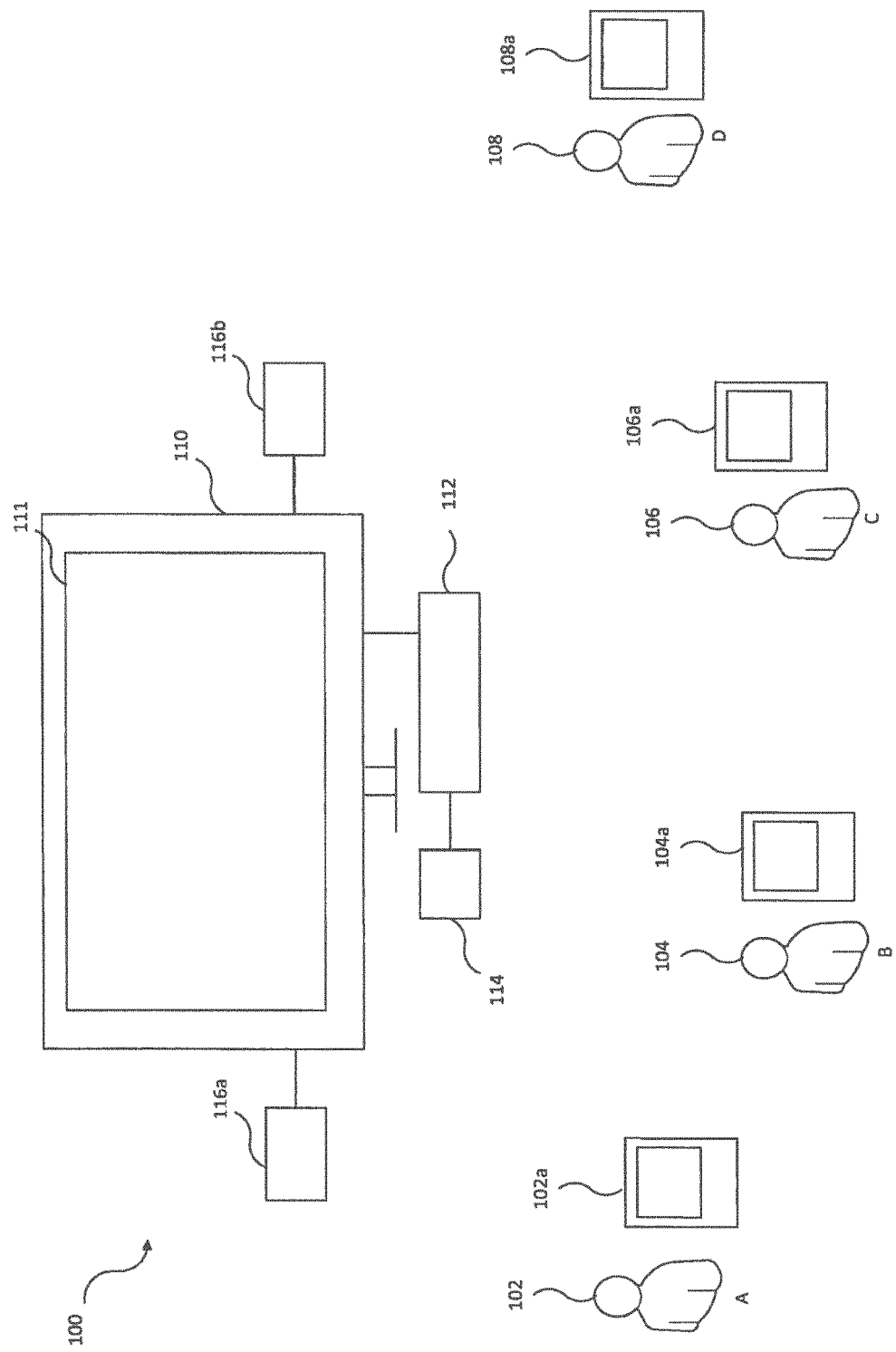
FIG. 1 illustrates an environment of a viewing system according to an embodiment.

FIG. 1 illustrates a system 100 comprising at least one media device 110 such as a television with a screen or display 111. The at least one media device 110 is coupled to a video playback device 112 which is configured to display media content on the screen 111 of the at least one media device 110. The video playback device 112 may comprise for example a set top box, a digital media player, or a video disc player etc. The video playback device 112 is coupled to receiver means 114. The receiver means 114 is configured to receive sensed data of consumers in the environment of the system 100. The sensed data is for use by the video playback device 112 as will be described later. Whilst FIG. 1 shows the video playback device 112 and the receiver means 114 as external to the viewing devices, it will be readily appreciated by those skilled in the art that the functionality of one or more of the video playback device 112 and the receiver means 114 may be incorporated into the viewing device 110.

The at least one media device 110 may be coupled to one or more media output devices such as speakers 116a, 116b for outputting audio signals. The one or more media output devices 116a, 116b may be external to the at least one media device 110 and coupled to the at least one media device 110 using a suitable interface (as shown in FIG. 1). The interface may be wired or wireless. Alternatively, the one or more speakers 116a, 116b may be integrated into the at least one media device 110.

The at least one media device(s) described above are exemplary only. The at least one media device(s) may comprise other synaptic or for example haptic output devices. For example a reconfigurable braille reading device may comprise, or be incorporated in said at least one media device capable of outputting content (in whatever form) to the consumer(s).

As shown in FIG. 1, a plurality of consumers may be present in the environment of the system 100 and want to watch or consume content delivered using the at least one media device 110. FIG. 1 shows a first consumer 102 (A), a second consumer 104 (B), a third consumer 106 (C), and a fourth consumer 108 (D). Whilst four consumers are shown as being present in the environment of the system 100, this number of consumers is merely an example. In some embodiments there may be only one consumer. In other embodiments there may be many consumers, such as in environments comprising theatres or cinemas for example.

Those skilled in the art will appreciate that, in some embodiments, there may be more than one media device. For example, each consumer, whilst in the same environment, may however be consuming media content on his or her own device capable of media output. This may for example, be the consumer's mobile phone, or "phablet", or tablet PC, or laptop, or could in some examples comprise a handheld gaming device and/or an audio device such as a digital music player.

The at least one media device may also comprise device systems including haptic and/or synaptic devices. Other examples comprise head mounted or worn projection displays ("glasses") for virtual reality or augmented reality applications, or any combination of these examples.

One or more of the plurality of consumers may be associated with a sensing device configured to sense a mood or emotional state of the user. For example consumer A 102 may be associated with a first sensing device 102a, consumer B 104 may be associated with a second sensing device 104a, consumer C 106 may be associated with a third sensing device 106c, and consumer D 108 may be associated with a fourth sensing device 108a.

The sensor or sensing devices may be, for example, stand-alone biometric sensor devices, or the sensors may be integrated into a user's mobile phone, personal digital assistant ("PDA"), a personal computer ("PC"), a tablet computer, a gaming device or other example media devices as described above, or may be sensors able to communicate with applications or "apps" for example running on such devices. Such sensors and/or devices are able to communicate with the system 100 by for example the receiver means using well known wireless or wired or optical interfaces and network means.

By way of example only, and without limitation, the sensing device(s) may be adapted to sense at least one or more one of facial measurement characteristics, body measurement characteristics, heartbeat, pulse, temperature, skin resistance, blood sugar levels, blood pressure, oxygen saturation levels, blink rate, voice signals, voice level and tone, iris pattern data.

Biometric information indicating or associated with the mood or emotional state of the consumer may be sensed by the sensing devices 102a, 104b, 106c, 108d associated with their respective consumers.

Sensors and Mood

The inventors have realised that feedback in the form of emotional mood or state of a consumer or consumer could be used in real time to adapt or alter the media content being consumed, so as to optimise the experience for the consuming consumer. For example, a consumer may select a romantic movie to view if in that mood, and then subsequently during consumption, the system may detect that the consumer is not enjoying the movie. In such a scenario, the system may then select alternative scene branches for the media content based on the sensed biometric data. In the preceding example, for instance, the system may select scenes representing a happier narrative arc or ending, with feedback from the sensors further being utilised to select further media fragments comprising appropriately linked scenes.

Another example scenario may comprise a film or movie in the "horror" genre. Biometric feedback may influence the control of scene selection if it is detected that the consumer(s) are "too frightened" or "upset". For example, a combination of pulse rate, blood pressure and/or voice tone data may indicate such an emotional state. In such a scenario alternative scenes may be selected for outputting, for example scenes in which a certain character "escapes death" or perhaps scenes which are less "gory" or "blood spattered" may be controlled for selection and output. Hence scenes for output to the consumer may be changed or altered based on the body sensed data.

In another embodiment the controlling to change scenes is based at least in part on a pre-set, or consumer set body sensed threshold.

Alternatively, in another embodiment, the output of the media content could be controlled to be stopped overall, if the system determines so on a pre-set, or consumer set threshold.

Figure 2:
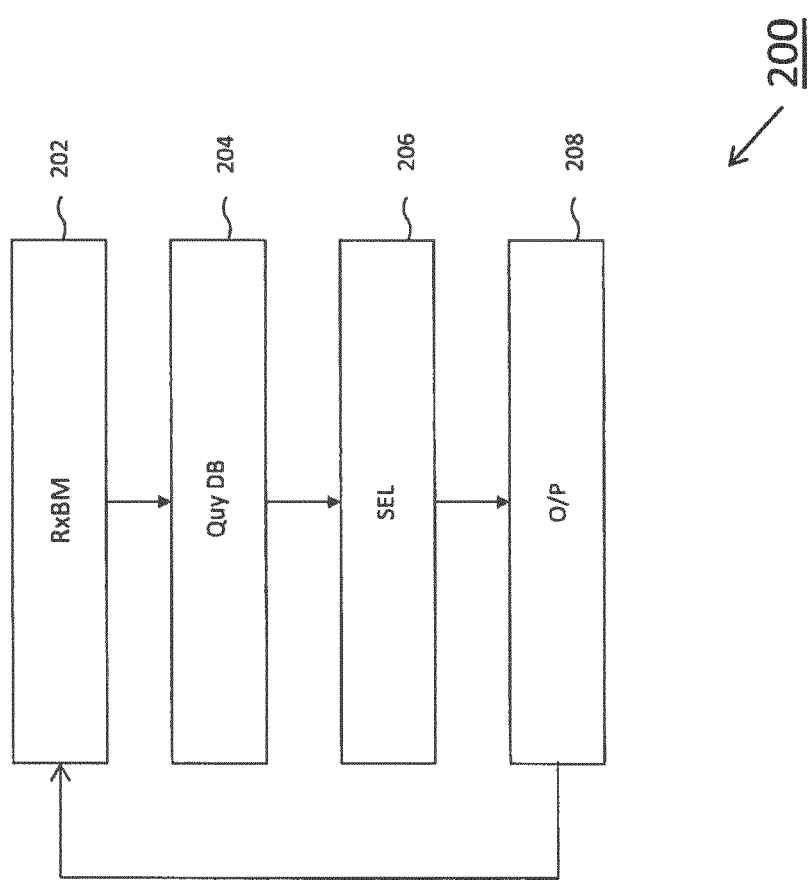
FIG. 2 is a flow chart for a process of delivering content to consumer(s) according to an embodiment.
Figure 3:
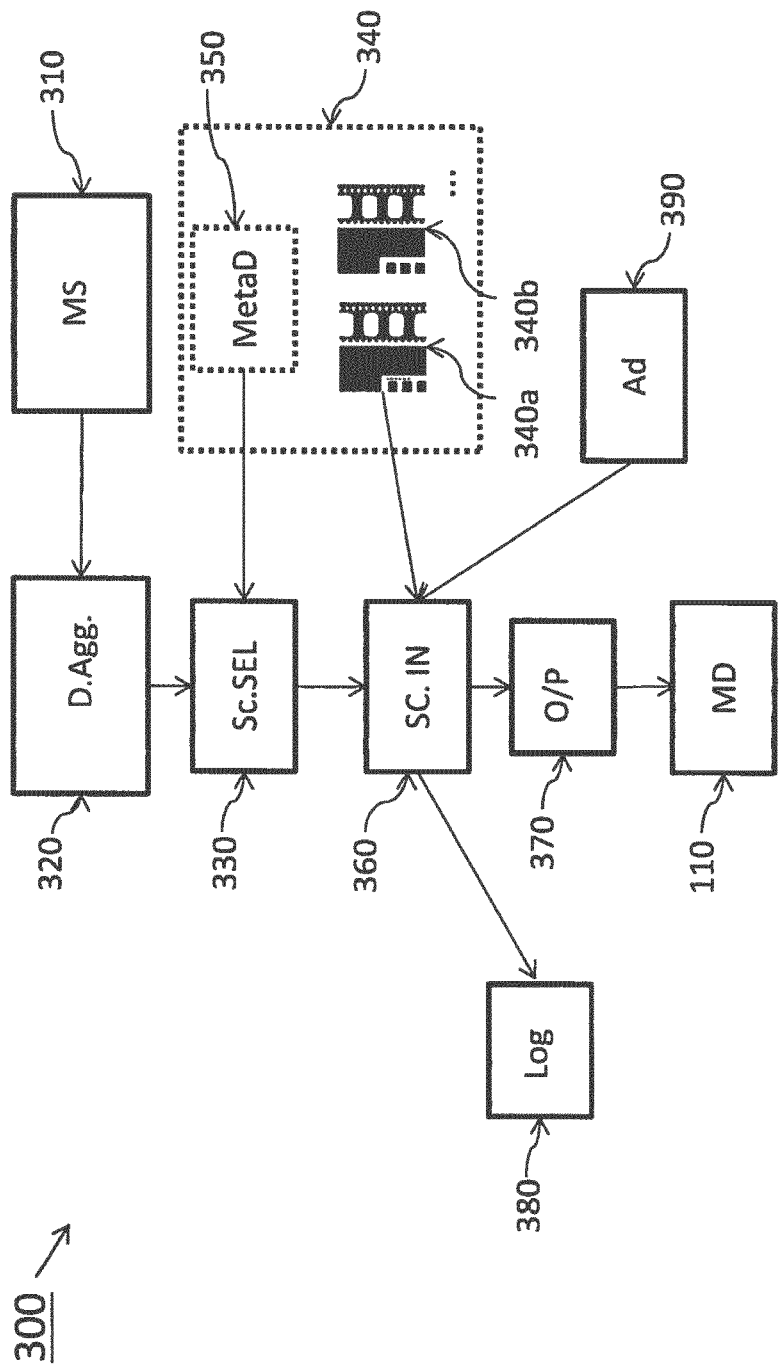
FIG. 3 shows a modular schematic view of a system according to another embodiment.

This will now be elaborated on with reference to FIG. 2 which illustrates an example method 200 performed by the system of FIG. 1 (or FIG. 3).

In this embodiment, the sensors 102*a*, 104*b*, 106*c*, 108*d* provide body sensed data indicating the mood or emotional state of the respective consumer at step 202.

The body sensed data may comprise at least one or more of facial measurement characteristics, body measurement characteristics, heartbeat, pulse, temperature, skin resistance, blood sugar levels, blood pressure, oxygen saturation levels, blink rate, voice signals, voice level and tone, iris pattern data.

By way of example, data indicating a scared mood may be represented by combining biometric data from heart rate (increased), blood pressure (increased), voice level (quiet or whimpering) and an increased blink rate. Such data may be compared by the at least one processor of the system against a threshold to indicate the mood.

Those skilled in the art will recognise that many combinations, depending on the available sensors may be constructed to determine thresholds.

In another embodiment, data collected from the same consumer may, over time, be used as a baseline to determine thresholds for that consumer, with feedback from the consumer aiding fine tuning of such thresholds.

In another embodiment, the thresholds may be set such that output is actually controlled to stop, i.e. the biometric data passes a threshold associated with stopping the content (which may for example indicate that the consumer was not enjoying the content at all, or that the consumer was for example too upset or scared to carry on consuming the content).

The threshold may have parental input for children, to help control the media content they consumer.

This data (RxBM) is received 114 by the system 100.

The system processor then queries a datastore or memory 340 at step 204 (Quy DB), the datastore or memory storing media content.

The process then flows to step 206 (BEL) at which appropriate media content or fragments or scenes based on the sensed body data are selected, and such selected media content is then controlled for output at step 208 (O/P).

The process then returns to step 202 to constantly receive body sensed data and further select and control appropriate media content in dependence on the monitored and sensed body data.

Hence, the control of the media content selected for output to the at least one consumer may be substantially continuously based on the sensed body data indicating the current mood or state of the at least one consumer.

Note that different media content may be selected for output to different consumers 102 (A), 102 (B), 102 (C), 102 (D) if they are consuming such content on their own media devices wither in the vicinity of the system 100 or if they are a virtual crowd connected via for example the internet to the system 100. The media output may not only comprise different versions of the same overall content (e.g. language versions), but in some embodiments may comprise differing endings or story or narrative arcs of the same overall content in dependence on each consumers sensed body data.

In some embodiments the sensed body data for one consumer 102 (A) from more than one sensor may be aggregated to provide an overall indicator to the system 100 of the current mood or changing state of the consumer.

In some embodiments the sensed body data for more than one consumer 102 (A), 102 (B), 102 (C), 102 (D) from more than one sensor 102*a*, 104*a*, 106*a*, 108*a*, may be aggregated to provide an overall indicator to the system 100 of the current mood or changing state of the multiple consumers or audience.

In other embodiments each consumer may have more than one associated sensor 102*a*, 104*a*, 106*a*, 108*a* which provide body sensed data at substantially the same time to the system 100.

Another embodiment will now be described with reference to FIGS. 3 and 4.

FIG. 3 illustrates modular functional blocks of a system embodiment 300. The system comprises a monitoring system 310 which receives audience or consumer sensed body data. This data is communicated to a data aggregation module 320 which may sort and average the data over time, or per consumer, or a combination of both for example. The aggregated data is passed from the data aggregation module 320 to a scene selection module 330.

The scene selection module is connected to a datastore 340 suitable for storing media content.

In FIG. 3, the media content is stored as a selection of multiple media fragments 340*a*, 340*b* comprising scenes of a movie or film for example. The media fragments may be linked serially or multidimensionally. For example, in multidimensional linking, a film may have a beginning arc comprising a multiple number of media fragments linked temporally one after the other. The film may also then have several different "middle" arcs or portions or narrative tracks, and similarly several different ending arcs or portions or narrative tracks or pathways. One may visualise such data as multi-dimensionally arranged since the fragments or story lines are non-linear.

In a serial linking asset, fragments follow on from each other. A fragment may be "skipped" based on sensed body data.

Fragments may make up scenes of the media content. The media content may be a movie or film, or it may also encompass a video game (2D, 3D, virtual, augmented or 3D) or any other suitable media content.

In this embodiment there is also provided metadata 350 linking the fragments 340*a*, 340*b* with sensed body data characteristics.

The metadata may be linked to the varying arcs or pathways through the media content, characterising such arcs therein. For example, body data indicating an unhappy mood may be linked to arcs that display a happy ending for the movie, and so on. Those skilled in the art will appreciate that many variations on the linking depending on the media content and sensed body data may be utilised.

The system also comprises a scene insertion engine or module 360 for inserting the selected media fragments in synchronised order to an output module 370 connected to at least one media device 110 for presenting the media content to the consumer or consumers for consumption.

The system may also optionally, in some embodiments, have a logging module 380 connected to the scene insertion engine 360. The logging module 380 may log system performance to aid optimisation of said performance against predetermined criteria such as for example, A/V sync error, network lag and so on as recognised by those skilled in the art.

The system may also optionally, in some embodiments, have an advertising module 390 connected to the scene insertion engine 360. The advertising module may then offer additional media content in the form of advertisements to the scene insertion engine 360. Such advertisements may be linked to the sensed body data to help target the adverts based on the mood of the consumers or users.

Figure 4:
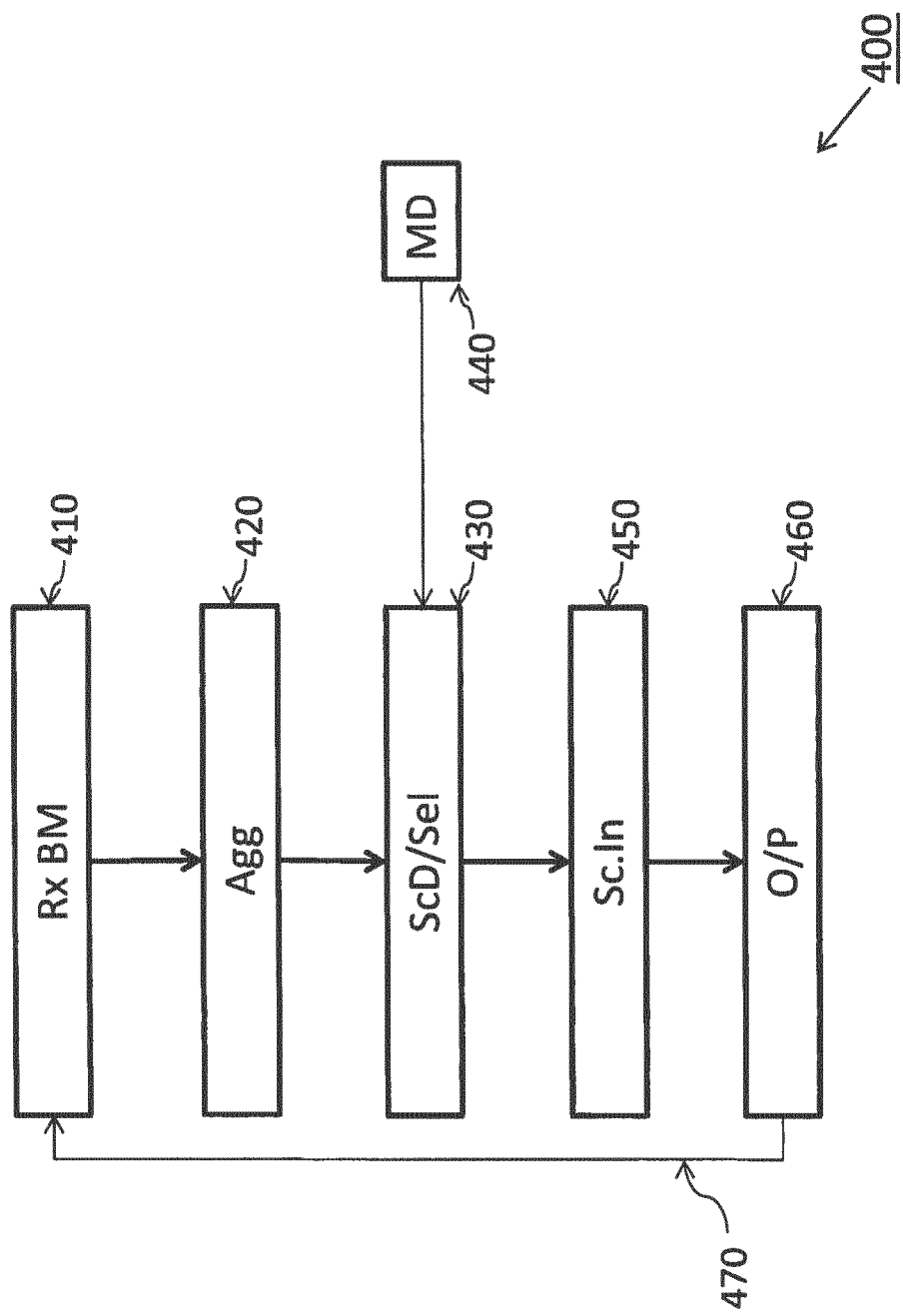
FIG. 4 shows a process according to an embodiment.

FIG. 4 illustrates an embodiment process flow 400 as may be carried out by the system embodiment of FIG. 3.

At step 410 the monitoring system 310 receives audience or consumer sensed body data (RxBM) and communicates this at step 420 (Agg) to the data aggregation module 320 which may sort and average the data over time, or per consumer, or a combination of both for example. The aggregated data is passed from the data aggregation module 320 to a scene selection module 330 which selects at step 430 scenes as described above with reference to FIG. 3 based on the stored 340 media fragments and metadata 440 provided as input to the scene selection module 330.

Flow then passes to the scene insertion engine 360 at step 450 which synchronises and inserts the selected media content to control output at step 460 to the at least one consumer's (or consumers') media devices.

Flow then passes 470 back to the monitoring and receiving (RxBM) of body sensed data at step 410.

Hence, media content is controlled for selection and output substantially in real time based on sensed body data indicating the mood or emotional state of the consumer, or consumers, or audience. Furthermore, the constant monitoring of the state enables further selection and update control in order to try to match the mood of the consumer(s) as his or her mood changes during the consumption of the media content.

In the above a content delivery system for controlling media content provided by at least one media device for media consumption by at least one consumer is described. In an embodiment the system comprises at least one sensor for sensing body data of the at least one consumer, a receiver for receiving sensed body data from the sensor, a data store storing media content for selection, at least one media device for outputting said selected content to said at least one consumer, and at least one processor configured to query said data store and control the selection of said media content based at least in part on the sensed body data, and control the output of said selected media content to said at least one media device. The sensed body data may indicate the mood or emotional state of the consumer.

It will be appreciated that the above embodiments have been described only by way of example, and other variants or applications may be apparent to a person skilled in the art given the disclosure herein.

The present invention is not limited by the described examples but only by the appendant claims.

The invention claimed is:

1. A computer implemented method for controlling media content provided by at least one media device for media consumption by at least one consumer, the media content arranged in multiple fragments, the method comprising:
storing a plurality of media fragments, the fragments being linked multidimensionally based on a temporal link and a body state link, wherein at least some of the fragments are associated with a body data state;
outputting a first portion of media content to the at least one consumer according to a first pathway corresponding to a first temporal sequence of a plurality of fragments of the multiple media fragments;
receiving, from at least one sensor, sensed body data of the at least one consumer; and
outputting a second portion of media content to the at least one consumer following the first portion of media content, according to a second pathway corresponding to a second temporal sequence of a plurality of fragments of the multiple media fragments, and a link of a body data state of at least one of the plurality of fragments in the second temporal sequence with the sensed body data, wherein there is provided multiple sets of temporal sequences of a plurality of fragments of the multiple media fragments, each set being associated with a body data state, the method further comprising selecting the set associated with the body data state matching the sensed body data state.

2. A method according to claim 1, wherein the multiple fragments are linked further by scene decision metadata.

3. A method according to claim 1, wherein the controlling comprises changing scenes of said media content for output.

4. A method according to claim 3, wherein the controlling to change scenes is based at least in part on a pre-set or consumer set body sensed threshold.

5. A method according to claim 1, wherein the outputting comprises skipping a fragment by stopping the fragment and starting a new fragment.

6. A method according to claim 1, wherein the controlling outputting of the selected media content is stopped.

7. A method according to claim 6, wherein the stopping of the output is based on a pre-set, or consumer set body sensed threshold.

8. The method of claim 1 in which the media content is provided for consumption by a plurality of users, the step of receiving comprising sensed body data from a plurality of consumers, the method comprising aggregating the sensed body data, and selecting the second sequence of fragments in dependence on the aggregated sensed body data.

9. The method of claim 1 further comprising averaging the sensed body data from the at least one consumer over time, and selecting the second sequence of fragments in dependence on the averaged sensed body data.

10. A content delivery system for controlling media content provided by at least one media device for media consumption by at least one consumer, the system comprising:
at least one sensor for sensing body data of the at least one consumer, the at least one sensor adapted to sense biometric data indicating the mood or emotional state of the at least one consumer;

a receiver for receiving sensed body data from the sensor;

a data store storing media content for selection, wherein the data store stores the media content in multiple media fragments, the fragments being linked multidimensionally based on a temporal link and a body state link, wherein at least some fragments are associated with a body data state;

at least one media device for outputting said selected media content to said at least one consumer; and at least one processor configured to query said data store and output a first portion of media content to the at least one consumer according to a first pathway corresponding to a first temporal sequence of a plurality of fragments of the multiple media fragments, and to control the output of a second portion of media content according to a second pathway corresponding to a second temporal sequence of a plurality of fragments of the multiple media fragments, and a link of a body data state of at least one of the plurality of fragments in the second temporal sequence with the sensed body data, wherein there is provided multiple sets of temporal sequences of a plurality of fragments of the multiple media fragments, each set being associated with a body data state, the processor further configured to select the set associated with the body data state matching the sensed body data state.

11. A system according to claim 10, wherein the at least one sensor comprises means for sensing at least one of: facial measurement characteristics, body measurement characteristics, heartbeat, pulse, temperature, skin resistance, blood sugar levels, blood pressure, oxygen saturation levels, blink rate, voice signals, voice level and tone, and iris pattern data.

12. A system according to claim 10, wherein the processor is further configured to aggregate the sensed body data over time.

13. A system according to claim 10, further comprising more than one sensor and wherein the sensed body data is received from said more than one sensor.

14. A system according to claim 10, wherein the sensed body data is received from more than one consumer.

15. A system according to claim 10, wherein the multiple fragments are further linked by scene decision metadata.

16. A system according to claim 15, wherein the processor is further configured to select media content for output by computing a vector based on the sensed body data and scene decision metadata.

17. A system according to claim 10, further comprising a scene insertion engine for controlling the insertion and synchronising of said output to said at least one media device.

18. A computer program product for controlling media content provided by at least one media device for media consumption by at least one consumer, wherein the media content is arranged in multiple fragments, the computer program product being embodied on a computer readable non-transitory medium and configured so as to cause a processor, when executed, to:

output a first portion of media content to the at least one consumer according to a first pathway corresponding to a first temporal sequence of a plurality of fragments of the multiple media fragments;

receive from at least one sensor sensed body data of the at least one consumer; and output a second portion of selected media content to the at least one consumer following the first portion of media content according to a second pathway corresponding to a second temporal sequence of a plurality of fragments of the multiple media fragments, and a link of a body data state of at least one of the plurality of fragments in the second temporal sequence within the sensed body data, wherein there is provided multiple sets of temporal sequences of a plurality of fragments of the multiple media fragments, each set being associated with a body data state, and to further select the set associated with the body data state matching the sensed body data state.

* * * * *